United States Patent
Ebata et al.

(10) Patent No.: US 9,020,238 B2
(45) Date of Patent: Apr. 28, 2015

(54) STEREOSCOPIC IMAGE GENERATION METHOD AND STEREOSCOPIC IMAGE GENERATION SYSTEM

(75) Inventors: Masaru Ebata, Tokyo (JP); Yuichi Somiya, Tokyo (JP)

(73) Assignee: M. Soft Co., Ltd., Tokyo (JP)

( * ) Notice: Subject to any disclaimer, the term of this patent is extended or adjusted under 35 U.S.C. 154(b) by 0 days.

(21) Appl. No.: 13/287,470

(22) Filed: Nov. 2, 2011

(65) Prior Publication Data

US 2012/0269424 A1    Oct. 25, 2012

(30) Foreign Application Priority Data

Apr. 21, 2011   (JP) .................... 2011-94710

(51) Int. Cl.
*G06K 9/00* (2006.01)
*G06T 7/00* (2006.01)
*H04N 13/02* (2006.01)

(52) U.S. Cl.
CPC ............ *G06T 7/0051* (2013.01); *H04N 13/026* (2013.01); *H04N 13/0271* (2013.01); *H04N 2213/003* (2013.01); *G06T 7/0083* (2013.01)

(58) Field of Classification Search
CPC ............... G06T 7/0051; G06T 7/0075; G06T 2207/20228; H04N 13/0027; H04N 2213/002; H04N 2213/003
See application file for complete search history.

(56) References Cited

U.S. PATENT DOCUMENTS

2007/0146232 A1 *   6/2007   Redert et al. ............. 345/6

FOREIGN PATENT DOCUMENTS

JP    2002123842 A    4/2002

OTHER PUBLICATIONS

Fehn, "Depth-Image-based Rendering (DIBR), Compression, and Transimission for a new Approach on 3D-TV", May 21, 2004, SPIE Proceedings Stereoscopic Image Processing and Rendering, vol. 5291, p. 93-104.*
Zhang et al., "Recovering Consistent Video Depth Maps via Bundle Optimization", Jun. 28, 2008, IEEE Conference on Computer Vision and Pattern Recognition, 2008, p. 1-8.*
Felzenszwalb et al., "Efficient Belief Propagation for Early Vision", Oct. 2006, International Journal of Computer Vision, vol. 70, iss. 1, p. 41-54.*
Kunter et al., "Unsupervised object segmentation for 2D to 3D conversion", Feb. 18, 2009, SPIE Proceedings Stereoscopic Displays and Applications, vol. 7237.*
Office Action issued by USPTO dated Mar. 6, 2014 for pending U.S. Appl. No. 13/287,470.

* cited by examiner

*Primary Examiner* — Stephen R Koziol
*Assistant Examiner* — Timothy Choi
(74) *Attorney, Agent, or Firm* — Porzio, Bromberg & Newman, P.C.

(57) ABSTRACT

A stereoscopic image generation method and a stereoscopic image generation system that can generate, from an original image, a stereoscopic image that allows the viewer to perceive a natural stereoscopic effect are provided. The method includes a characteristic information acquisition step of acquiring characteristic information for each of pixels, a depth information generation step of generating depth information for each of the pixels on the basis of the characteristic information, and a stereoscopic image generation step of generating a stereoscopic image on the basis of the pieces of depth information.

15 Claims, 13 Drawing Sheets

200
Fig.7A
260
Fig.7B
Fig.7

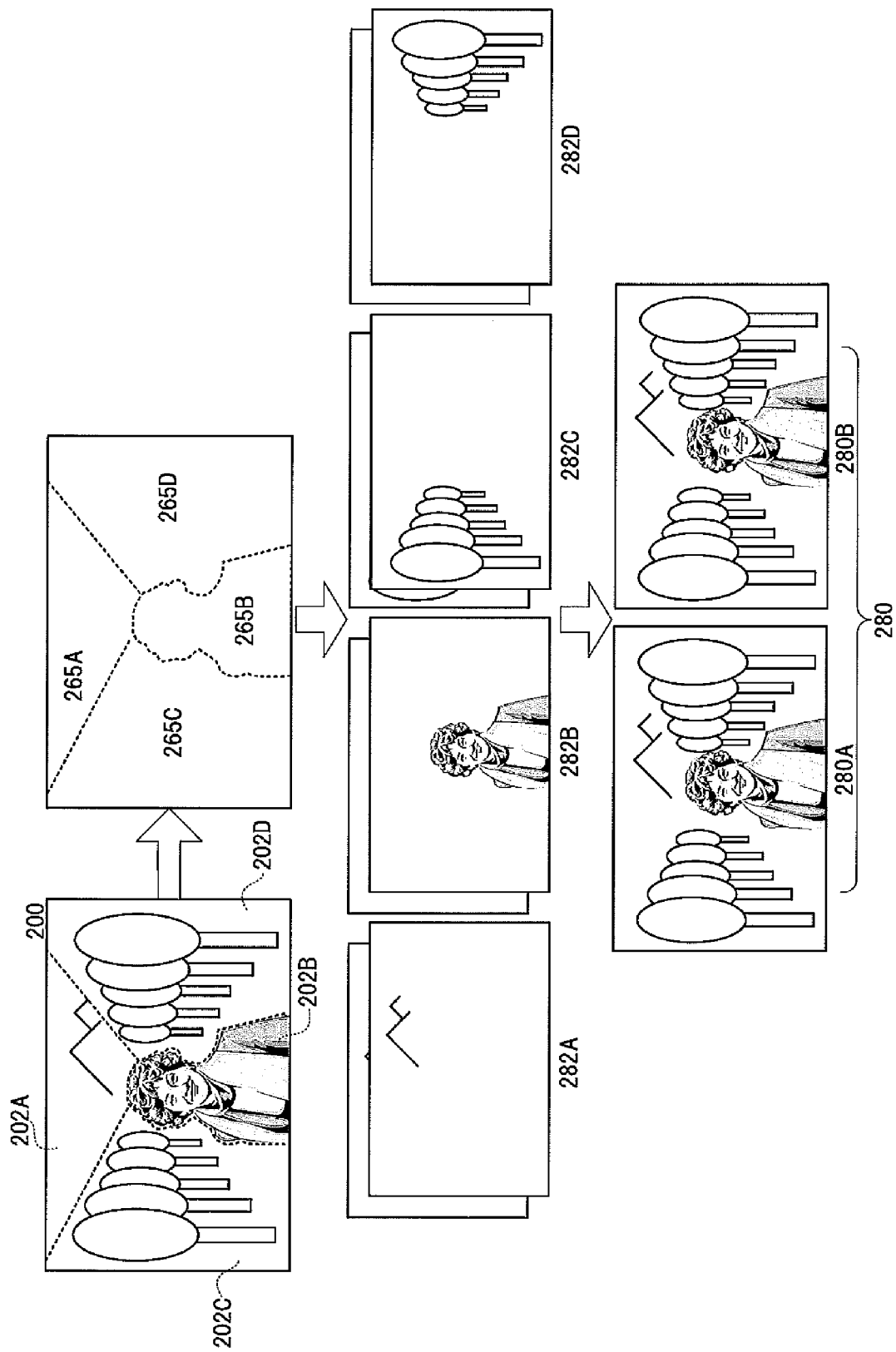

STEREOSCOPIC IMAGE GENERATION METHOD AND STEREOSCOPIC IMAGE GENERATION SYSTEM

CROSS-REFERENCE TO RELATED APPLICATION

This application claims priority to Japanese Patent Application No. 2011-94710 filed on Apr. 21, 2011, hereby incorporated in its entirety by reference into this application.

BACKGROUND OF THE INVENTION

1. Field of the Invention

The present invention relates to a stereoscopic image generation method and a stereoscopic image generation system for generating a stereoscopic image that allows the viewer of the image to perceive a stereoscopic effect due to parallax.

2. Description of the Related Art

In recent years, binocular parallax stereoscopic images that allow the viewers to perceive a stereoscopic effect by causing them to view different images with the left and right eyes respectively are being widely used in the field of movies and television and other fields. A technique for multi-view stereoscopic images in which images observable by the viewers are changed according to viewing angles to allow the viewers to perceive a stereoscopic effect is also being used for, for example, naked-eye stereoscopic devices. In addition, multi-view parallax stereoscopic images in which the binocular parallax method and the multi-view method are combined are being put to practical use. A parallax stereoscopic image is composed of a right-eye image presented to the right eye and a left-eye image presented to the left eye. The positions of the subjects in these images are shifted in a horizontal direction according to the binocular parallax of the human eyes to allow the viewer (observer) of the images to perceive a stereoscopic effect.

A conventional parallax stereoscopic image is generally generated by taking a right-eye image and a left-eye image simultaneously using two cameras arranged in a left-right direction. With this method, a right-eye image and a left-eye image with a parallax substantially similar to the binocular parallax of the human eyes can be directly obtained. Therefore, a natural stereoscopic image that does not cause the viewer to have an uncomfortable feeling can be generated.

However, with the method in which two cameras are used to take a right-eye image and a left-eye image, the two cameras must have the same specifications and be aligned correctly, and the images must be taken with the cameras perfectly synchronized with each other. Therefore, when the images are taken, specialized staff and a large number of specialized devices are required. This causes not only an increase in image cost but also a problem in that a large amount of time is required to set up and adjust the cameras and other devices.

A conventional multi-view stereoscopic image is generally generated by taking multi-view images simultaneously using a large number of cameras arranged at different viewpoints. However, the method in which a plurality of cameras are used to take multi-view images has a problem in that the plurality of cameras must have the same specifications and be aligned correctly and that the images must be taken with all the cameras synchronized with each other.

Particularly, to generate a multi-view parallax stereoscopic image, two cameras must be provided for each of different viewpoints so that images with parallax are taken. Therefore, such a multi-view parallax stereoscopic image is far from widespread use, unless there is a very specific purpose.

One technique proposed to address the above issues is to subject an image normally taken using a single camera to image processing to generate binocular parallax right-eye and left-eye images (see, for example, Japanese Patent Application Laid-Open No. 2002-123842). In this technique, first, depth information (a depth value) is set for each of pixels constituting an original image, and the horizontal positions of the pixels are changed according to the depth information to generate right-eye and left-eye images in which the positions of subjects in these images have been shifted according to binocular parallax.

With this technique, a stereoscopic image can be generated from a normal original image taken using a commonly used camera, and therefore photographing cost and photographing time can be reduced. In addition, stereoscopic images can be generated from existing movie and other contents, and general television programs can be converted to stereoscopic images and displayed on a television screen.

However, in the conventional method of generating a stereoscopic image from a normal original image, the original value of the hue, chroma, or lightness of each of the pixels constituting the original image (the chroma in Japanese Patent Application Laid-Open No. 2002-123842 above) is generally used as the depth information for each of the pixels. Therefore, the value of the depth information varies significantly across the boundary between, for example, a human, or a subject, and a background, and this causes a problem in that a depth discontinuity occurs.

If such a depth discontinuity occurs, an unnatural stereoscopic effect such as a so-called cardboard effect in which only the distance between a human or the like and a background is emphasized to cause the human image to be monotonous is perceived. In addition, when the positions of the pixels in the right-eye and left-eye images are changed, the amounts of movement of pixels contained in the human or the like are largely different from that of pixels contained in the background. Therefore, a large gap (loss) is formed in a part of the background that, in the original image, is covered with the human or the like.

In some conventional methods, to avoid such a gap, blurring processing is performed on boundary portions, or the image of a human or the like or a background is enlarged or deformed. However, such processing may not only cause deterioration of the quality of the stereoscopic image but also cause the viewer to have an uncomfortable feeling. In addition, the problem with the blurring processing and the enlarging-deforming processing is that the operational load on the operator who performs such processing on the stereoscopic image using software increases. This results in a problem in that the amount of processing work of the operator becomes enormous when a multi-view or multi-view parallax stereoscopic image is generated from an original image.

SUMMARY OF THE INVENTION

In view of the above circumstances, the present invention provides a stereoscopic image generation method and a stereoscopic image generation system that can generate, from an original image, a stereoscopic image that allows a viewer to perceive a natural stereoscopic effect.

To achieve the above object, a first aspect of the present invention provides a stereoscopic image generation method including: a characteristic information acquisition step of acquiring characteristic information for each of pixels constituting an original image; a depth information generation step of generating depth information for each of the pixels on the basis of the characteristic information; and a stereoscopic image generation step of generating a stereoscopic image in which positions of the respective pixels are changed on the basis of the pieces of depth information, wherein the depth information generation step includes an edge setting step of setting an edge for each of pairs of pixels extracted from the original image, a weight information setting step of setting weight information for each of the edges on the basis of the characteristic information, a start area selection step of selecting a start area from the pixels, a path information setting step of computing a path with regard to the weight information from the start area to each of the pixels and setting path information for each of the pixels, and a depth determination step of setting the depth information for each of the pixels on the basis of the path information for the pixel.

In the stereoscopic image generation method for achieving the above object, in the start area selection step of the above aspect of the present invention, a pixel contained in a region for a deepest part in the original image or a pixel contained in a region for a frontmost part in the original image can be selected as the start area.

In the stereoscopic image generation method for achieving the above object, in the start area selection step of the above aspect of the present invention, a plurality of start areas are selected.

In the stereoscopic image generation method for achieving the above object, in the path information setting step of the above aspect of the present invention, the path can be computed for each of the plurality of start areas, and a plurality of pieces of path information can be set for each of the pixels, and in the depth determination step, the depth information for each pixel can be set on the basis of the plurality of pieces of path information set for the each pixel by selecting one from the plurality of pieces of path information set for each of the pixels or combining the plurality of pieces of path information.

In the stereoscopic image generation method for achieving the above object, in the start area selection step of the above aspect of the present invention, a plurality of pixels contained in a predetermined region in the original image can be combined and selected as a single start area.

The stereoscopic image generation method for achieving the above object of the above aspect of the present invention can further include a region dividing step of dividing the original image into a plurality of regions. In the start area selection step, the start area can be selected for each of the plurality of regions. In the path information setting step, the path can be computed for each of the plurality of regions, and the path information can be set for each of the pixels.

In the stereoscopic image generation method for achieving the above object, in the region dividing step of the above aspect of the present invention, the original image can be divided into a plurality of regions corresponding to subjects contained in the original image.

To achieve the above object, a second aspect of the present invention provides a stereoscopic image generation system constituted by a computer and including: characteristic information acquisition means for acquiring characteristic information for each of pixels constituting an original image; depth information generation means for generating depth information for each of the pixels on the basis of the characteristic information; and stereoscopic image generation means for generating a stereoscopic image in which positions of the respective pixels are changed on the basis of the pieces of depth information, wherein the depth information generation means includes edge setting means for setting an edge for each of pairs of pixels extracted from the original image, weight information setting means for setting weight information for each of the edges on the basis of the characteristic information, start area selection means for selecting a start area from the pixels, path information setting means for computing a path with regard to the weight information from the start area to each of the pixels and setting path information for each of the pixels, and depth determination means for setting the depth information for each of the pixels on the basis of the path information for the pixel.

The present invention has an advantageous effect in that a stereoscopic image that allows the viewer to perceive a natural stereoscopic effect can be automatically generated from an original image.

BRIEF DESCRIPTION OF THE DRAWINGS

The above and other objects, features and advantages of the present invention will become apparent from the following description and appended claims, taken in conjunction with the accompanying drawings.

FIGS. 7A and 7B show an example of the generation of a depth map in the stereoscopic image generation system, FIG. 7A showing an original image, FIG. 7B showing the depth map;

FIG. 13 is a block diagram illustrating the flow of generating a stereoscopic image in the another example of the stereoscopic image generation system.

DETAILED DESCRIPTION OF THE PREFERRED EMBODIMENTS

Preferred embodiments of the present invention will next be described in detail with reference to the drawings.

Figure 1:
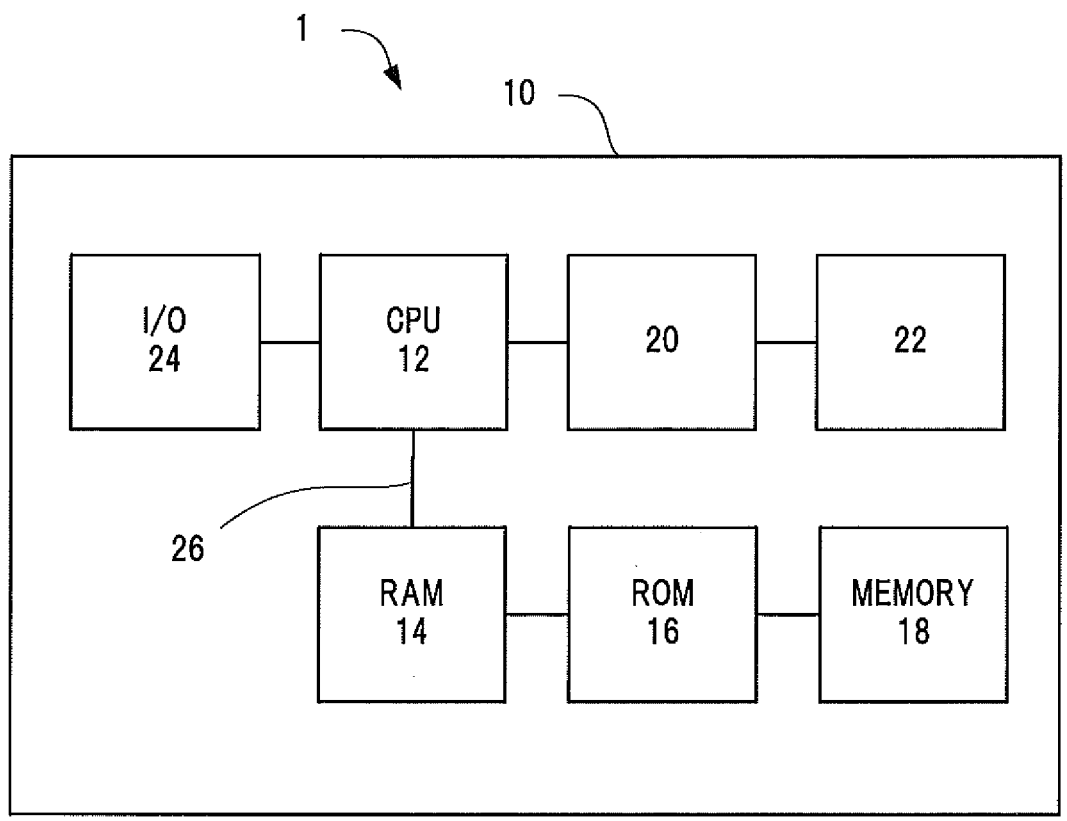
FIG. 1 is a block diagram illustrating the hardware configuration of a stereoscopic image generation system according to a first embodiment of the present invention.

FIG. 1 shows the internal configuration of a computer 10 constituting a stereoscopic image generation system 1 according to a first embodiment. The computer 10 is configured to include a CPU 12, a first storage medium 14, a second storage medium 16, a third storage medium 18, an input unit 20, a display unit 22, an input-output interface 24, and a bus 26. The CPU 12 is a central processing unit and executes various programs to realize various functions of the stereoscopic image generation system 1. The first storage medium 14 is a RAM (random access memory) and is a memory used as the work area of the CPU 12. The second storage medium 16 is a ROM (read only memory) and is a memory for storing basic programs executed on the CPU 12. The third storage medium 18 includes a hard disk drive provided internally with a magnetic disk, a disk drive containing a CD, DVD, or BD, a nonvolatile semiconductor flash-memory device, and other devices. The third storage medium 18 stores OS (operating system) programs for implementing the overall basic operations of the stereoscopic image generation system 1, stereoscopic image generation programs that are executed on the CPU 12 when a stereoscopic image is generated, various types of data such as a depth map used by the stereoscopic image generation programs and stereoscopic images, and other programs and data. The input unit 20 includes a keyboard, a mouse, and the like, and is a unit used by the operator to appropriately input information to the stereoscopic image generation system 1. The display unit 22 is a display for providing a visualized interface to the operator. The input-output interface 24 is an interface for inputting the data of an original image necessary for the stereoscopic image generation programs and outputting a depth map and a stereoscopic image generated by the stereoscopic image generation programs to the outside. The bus 26 is wiring used to mutually connect the CPU 12, the first storage medium 14, the second storage medium 16, the third storage medium 18, the input unit 20, the display unit 22, the input-output interface 24, and other units to achieve communications.

Figure 2:
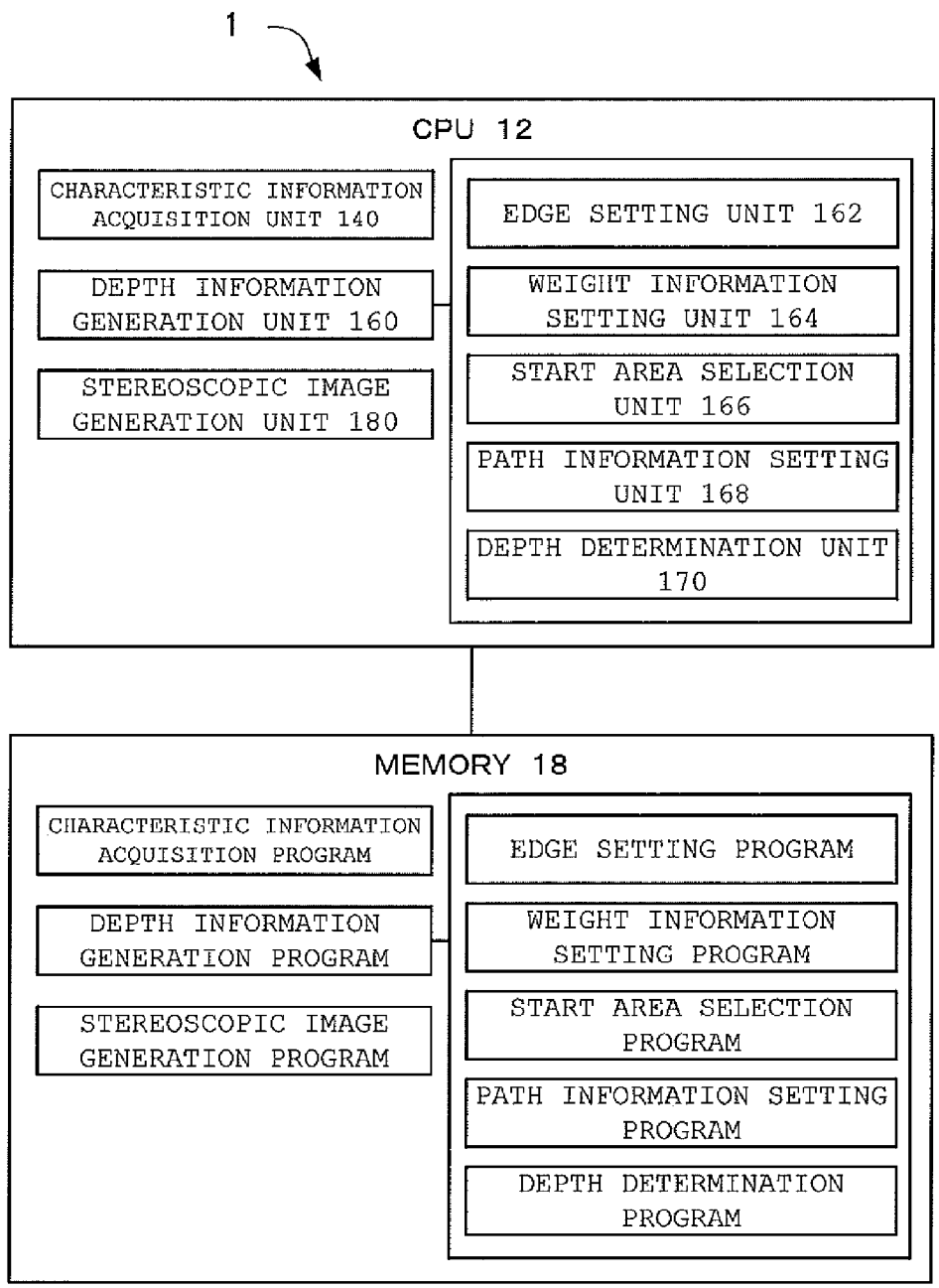
FIG. 2 is a block diagram illustrating the program configuration and functional configuration of the stereoscopic image generation system.
Figure 3:
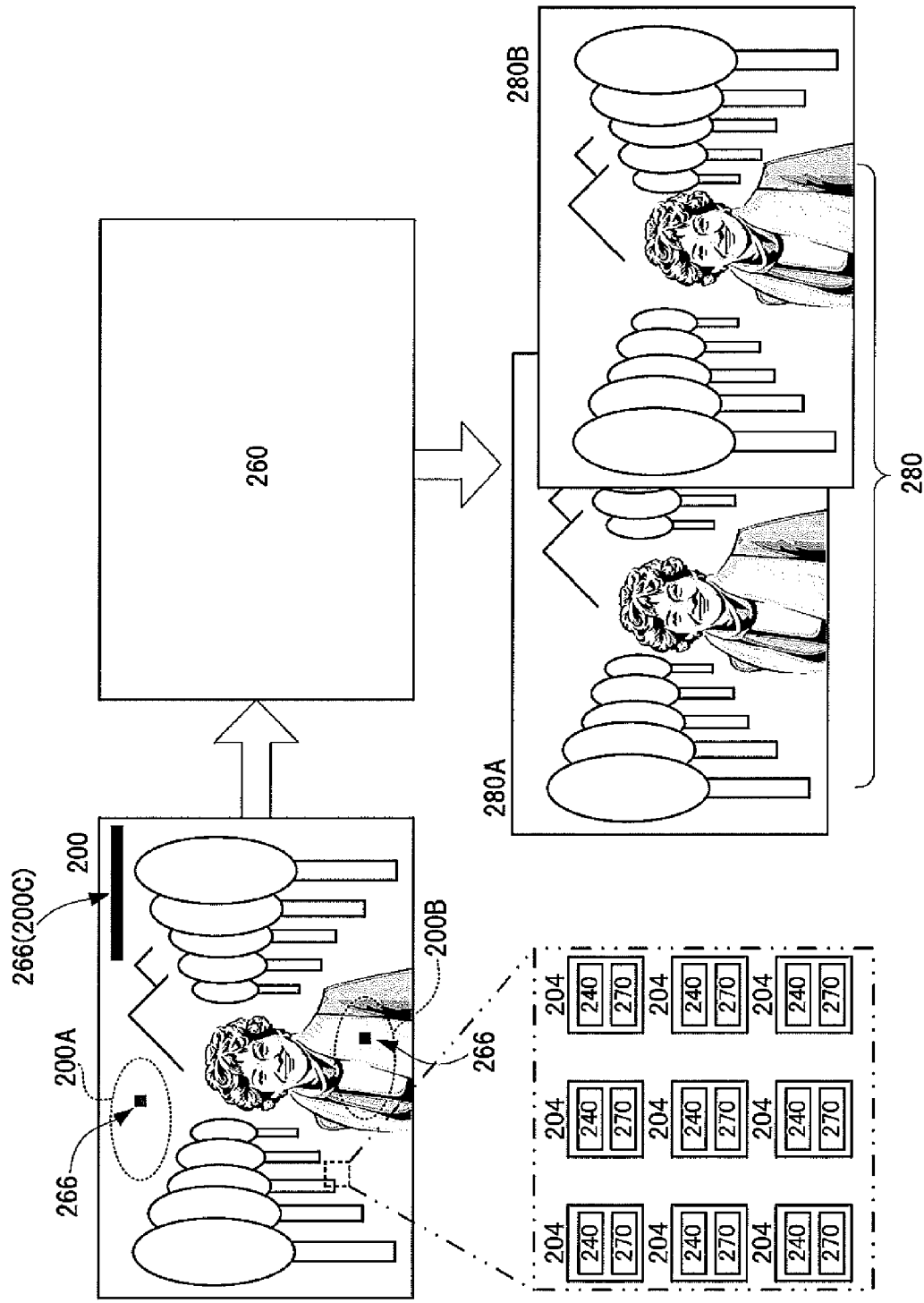
FIG. 3 is a block diagram illustrating the flow of generating a stereoscopic image in the stereoscopic image generation system.
Figure 4:
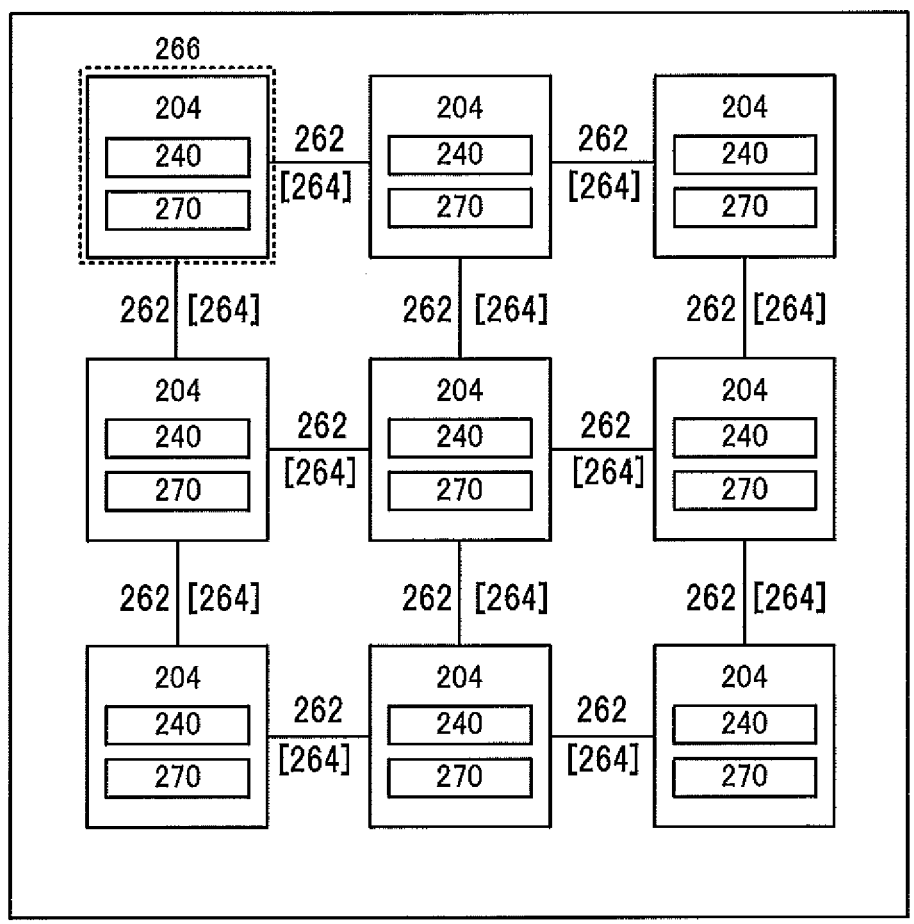
FIG. 4 is a schematic diagram illustrating the generation of a depth map in the stereoscopic image generation system.
Figure 5:
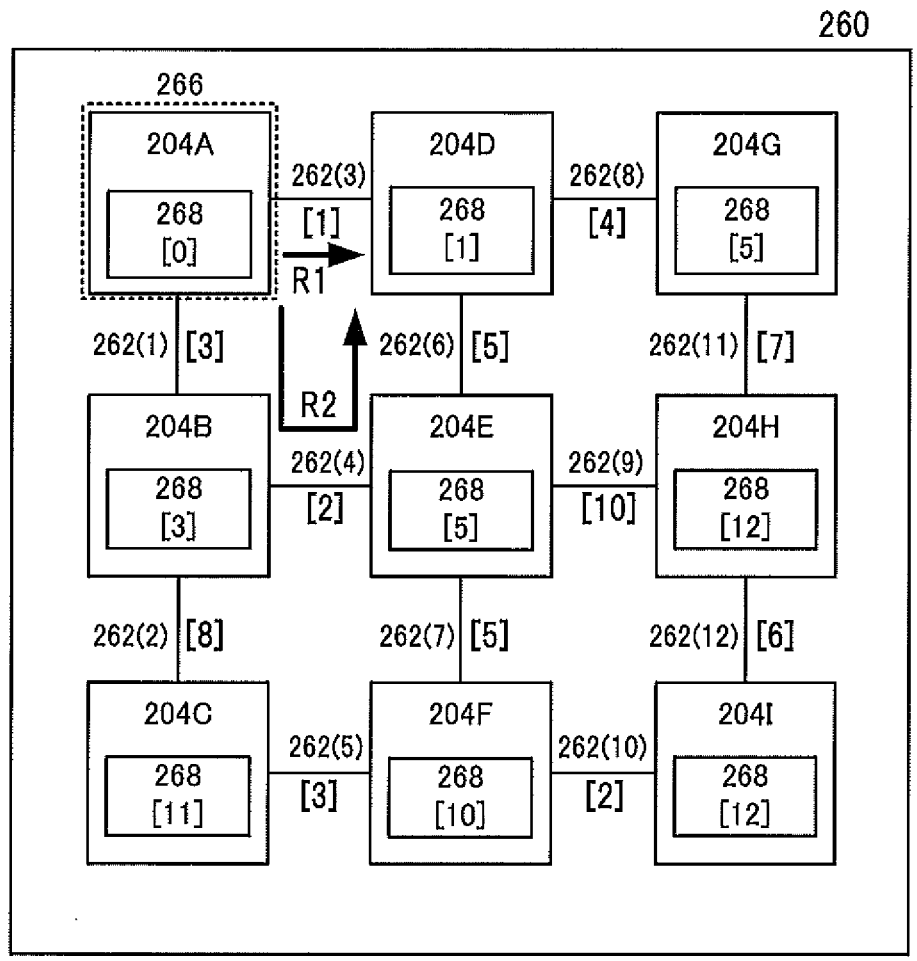
FIG. 5 is a diagram illustrating an example in which shortest-path information is computed in the stereoscopic image generation system.

FIG. 2 shows the program configuration of the stereoscopic image generation programs stored in the third storage medium 18 and the functional configuration of the functions implemented in the stereoscopic image generation system 1 when the CPU 12 executes these stereoscopic image generation programs. FIGS. 3 to 5 schematically show the procedure for generating a stereoscopic image that is executed in the stereoscopic image generation system 1. In the stereoscopic image generation system 1, the configuration of the stereoscopic image generation programs has a correspondence with the configuration of the functions. Therefore, only the functional configuration of the stereoscopic image generation system 1 will be described, and the description of the programs is omitted here.

The stereoscopic image generation system 1 is configured to include a characteristic information acquisition unit 140 implemented by a characteristic information acquisition program, a depth information generation unit 160 implemented by a depth information generation program, and a stereoscopic image generation unit 180 implemented by a stereoscopic image generation program.

The characteristic information acquisition unit 140 acquires characteristic information 240 for each of pixels 204 constituting an original image 200. For example, the characteristic information 240 may be characteristic information for a single pixel 204 such as its hue, brightness, chroma, or color space. In addition, characteristic information derived from the relationship between an object pixel 204 and its surrounding pixels 204 may be used. When a moving image including a plurality of frames is used, characteristic information derived from a temporal change in characteristics of a pixel 204 (the relationship in characteristics between a pixel in a frame and the same pixel in the previous or subsequent frame) may also be used.

The depth information generation unit 160 generates a depth map 260 in which a piece of depth information 270 is set for each pixel 204 on the basis of the pieces of characteristic information 240 acquired for the respective pixels 204.

More specifically, the depth information generation unit 160 includes an edge setting unit 162, a weight information setting unit 164, a start area selection unit 166, path information setting unit 168, and a depth determination unit 170.

As shown in FIG. 4, the edge setting unit 162 sets an edge 262 for each of pairs of pixels 204 extracted from the original image 200. The edge 262 conceptually means a line or a path connecting a pair of pixels 204. In the sense of graph theory, a pair of pixels 204 are nodes or vertices, and an edge 262 is a branch or a side. In the present embodiment, four edges 262 are set between each pixel 204 and its adjacent upper, lower, left, and right pixels 204. However, the present invention is not limited to the case in which edges 262 are set between each pixel 204 and its adjacent upper, lower, left, and right pixels 204. Edges 262 may be set between each pixel 204 and its four diagonally adjacent pixels 204 (upper right, upper left, lower right, and lower left pixels) or between each pixel 204 and eight pixels 204 including these pixels and upper, lower, left, and right pixels. It is not always necessary to set an edge 262 between adjacent pixels 204. An edge 262 may be set for a pair of pixels 204 separated from each other by a predetermined distance with omitting another pixel(s) interposed therebetween, i.e., for a pair of pixels 204 after thinning-out processing. Of course, an edge 262 may be set for a pair of pixels 204 isolated by a large distance.

The weight information setting unit 164 sets weight information 264 for each edge 262 on the basis of the pieces of characteristic information 240 of pixels 204 connected by the edge 262. In the present embodiment, the weight information 264 of an edge 262 is set using the difference between the pieces of characteristic information 240 of a pair of pixels 204 connected by the edge 262. The weight information 264 increases as the difference increases and decreases as the difference decreases. The weight information 264 of an edge 262 is not limited to the "difference" between a pair of pieces of characteristic information 240 of pixels 204 at opposite ends of the edge 262. The weight information 264 may be set using, for example, any of various functions for computing the weight information using the pair of pieces of characteristic information 240.

The start area selection unit 166 selects a start area 266 among the pixels 204 in the original image 200. The start area 266 is used as a start point when shortest-path information 268 described later is set. The start area 266 can be freely selected among the pixels in the image 200. For example, it is preferable to select the start area 266 from a group of pixels in a region 200A located on the deepest side in the original image 200 or from a group of pixels in a region 200B located on the frontmost side, as shown in FIG. 3. Although the details will be described later in a second embodiment, a plurality of start areas 266 may be selected from the pixels in the original image 200. As also shown in FIG. 3, all the pixels 204 contained in a predetermined region 200C in the original image 200 may be selected collectively as one start area 266.

In the present embodiment, one pixel in the region 200A located on the deepest side in the original image 200 is selected as the start area 266.

The path information setting unit 168 computes the shortest path from the start area 266 to each of the pixels 204 in the original image 200 using the pieces of weight information 264 of paths (edges 262) from the start area 266 to the pixel 204 and sets the shortest-path information 268 for that pixel 204. A specific example of this procedure will be described with reference to FIG. 5.

To simplify the description, suppose that the original image 200 is composed of nine pixels 204A to 204I arranged in three rows and three columns and that the upper left pixel 204A is a pixel for a region located on the deepest side and is set as a start area 266. One of pieces of weight information 264 ranging from 1 to 10 is pre-set for each of twelve edges 262(1) to 262(12) connecting the pixels 204A to 204I using the relative differences between the pieces of characteristic information (not shown) of the pixels 204A to 204I. Now consider the path to the upper central pixel 204D. Examples of the path connecting the start pixel 204A and the pixel 204D include a first path R1 composed only of the edge 262(3) directly connecting the start pixel 204A and the pixel 204D and a second path R2 composed of three edges 262(1), 262(4), and 262(6) that connect the start pixel 204A, the pixel 204B, the pixel 204E, and the pixel 204D. The sum of the pieces of weight information 264 in the first path R1 is "1," and the sum of the pieces of weight information 264 in the second path R2 is "10" being 3+2+5. The sum of the pieces of weight information 264 is similarly computed for all the possible paths between the start pixel 204A and the pixel 204D, and the path having the smallest sum is used as the shortest path. In the above example, the first path R1 is the shortest path, and therefore the sum of the pieces of weight information 264 in the shortest path that is "1" in the first path R1 is set as the shortest-path information 268 for the pixel 204D.

The path information setting unit 168 sets the shortest-path information 268 for all the pixels 204A to 204I using the method described above. As a result of this procedure, "0" is set as the shortest-path information 268 for the pixel 204A, "3" is set for the pixel 204B, "11" is set for the pixel 204C, "1" is set for the pixel 204D, "5" is set for the pixel 204E, "10" is set for the pixel 204F, "5" is set for the pixel 204G, "12" is set for the pixel 204H, and "12" is set for the pixel 204I.

The depth determination unit 170 sets the depth information 270 for each pixel 204 on the basis of the shortest-path information 268. In the present embodiment, the depth determination unit 170 uses the pieces of shortest-path information 268 as they are as the pieces of depth information 270. On the depth map 260, the pieces of depth information 270 set for the respective pixels 204 are visually mapped.

If necessary, values obtained by correcting the pieces of shortest-path information 268 may be used as the pieces of depth information 270. Different correction functions may be prepared for different original images 200 such as an image of an outdoor scene and an image of an indoor scene, and one of the correction functions selected according to the contents of the original image 200 may be applied to the piece of shortest-path information 268 to compute the pieces of depth information 270.

The stereoscopic image generation unit 180 generates, on the basis of the depth map 260, a stereoscopic image 280 composed of a right-eye image 280A and a left-eye image 280B in which the positions of the pixels 204 have been changed. More specifically, the right-eye image 280A and the left-eye image 280B with parallax are generated using the pieces of depth information 270 in the depth map 260 such that the amounts of horizontal displacements (shifts) of pixels 204 for a region located on the deeper side are small and the amounts of horizontal displacements of pixels 204 for a region located on the front side are large. The viewer of the images views the right-eye image 280A with the right eye and the left-eye image 280B with the left eye, so that the parallax between these images is processed in the brain of the viewer to allow the viewer to perceive a stereoscopic effect.

Figure 6:
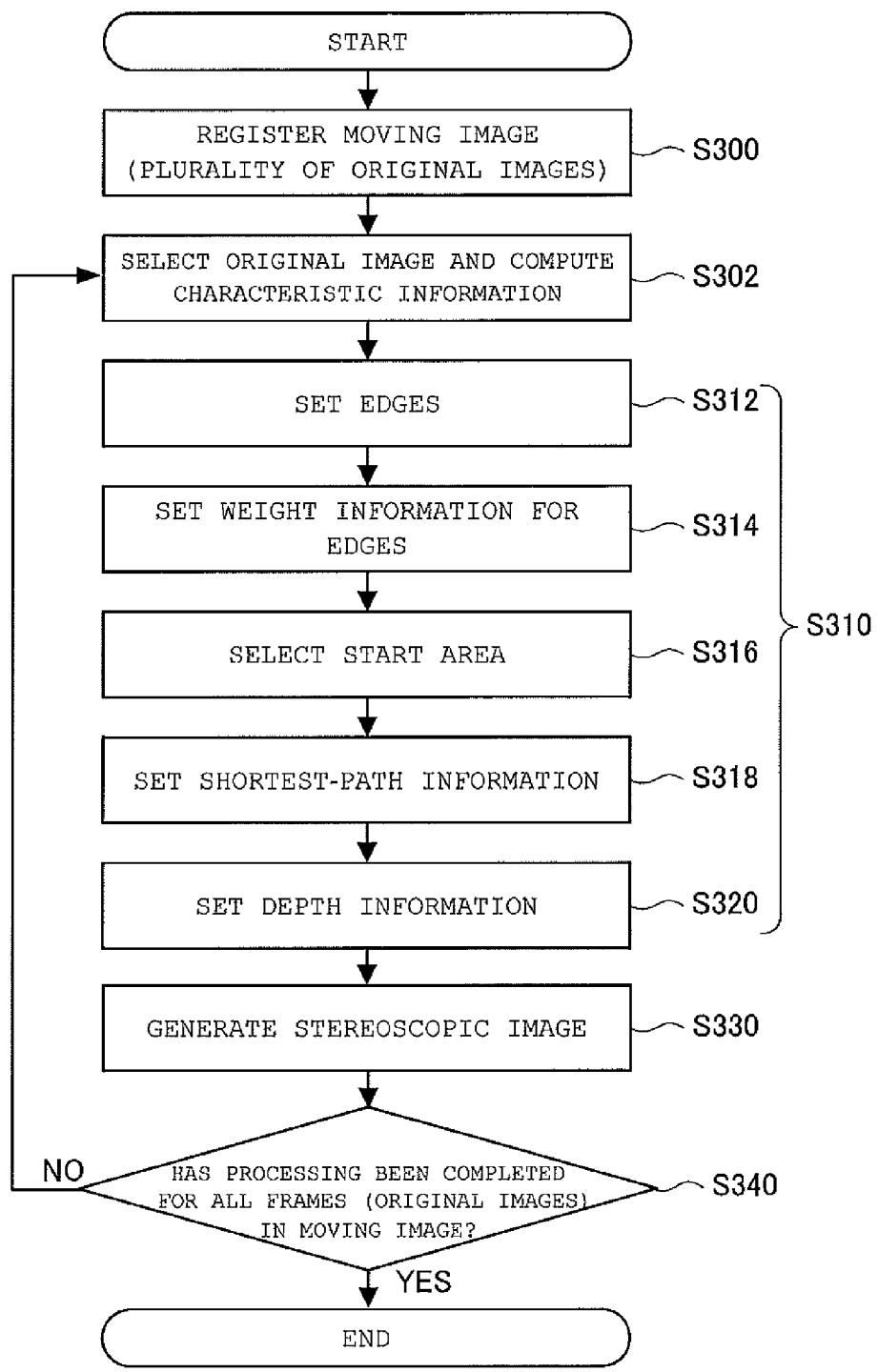
FIG. 6 is a flowchart showing the procedure for generating a stereoscopic image in the stereoscopic image generation system.

Next, referring to FIG. 6, the procedure for generating a stereoscopic image using the stereoscopic image generation system 1 will be described.

First, in step 300, a moving image composed of a plurality of original images (frames) 200 is registered in the third storage medium 18 through the input-output interface 24 of the stereoscopic image generation system 1. Then in step 302, the characteristic information acquisition unit 140 extracts a first original image (frame) 200 from the moving image and acquires the characteristic information 240 for each of the pixels 204 constituting the first original image (a characteristic information acquisition step).

Next, in step 310, a depth map 260 in which depth information 270 is set for each of the pixels 204 on the basis of the pieces of characteristic information 240 is generated (a depth information generation step). Specifically, the depth information generation step 310 is composed of steps 312 to 320.

First, in step 312, an edge 262 is set for each of pairs of adjacent pixels 204 (an edge setting step). Then in step 314, weight information 264 is set for each edge 262 on the basis of the pieces of characteristic information 240 that have been set for all the pixels 204 (a weight information setting step). Next, in step 316, a start area 266 is selected among the pixels 204 (a start area selection step). Then the process proceeds to step 318. In step 318, a shortest path is computed for each pixel 204 such that the cumulative sum of the pieces of weight information 264 computed along the path from the start area 266 to that pixel 204 is minimized, and the pieces of shortest-path information 268 computed along the shortest paths for all the pixels 204 as the minimum cumulative sums of the pieces of weight information 264 are set for all the pixels 204 (a path information setting step). Then in step 320, depth information 270 is set for each of the pixels 204 using the pieces of shortest-path information 268, and the pieces of depth information 270 are grouped to generate a depth map 260 for the grouped pixels (a depth determination step).

After completion of the depth information generation step 310, the process proceeds to step 330, and a stereoscopic image composed of a right-eye image 280A and a left-eye image 280B in which the positions of the pixels 204 are shifted on the basis of the determined pieces of depth information 270 (the depth map 260) is generated (a stereoscopic image generation step).

In the example shown above, the pieces of depth information 270 are grouped to generate the depth map 260, and the stereoscopic image 280 is generated using the depth map 260. However, the present invention is not limited thereto. The stereoscopic image 280 can be generated using the pieces of depth information 270 as they are without generating the depth map. It is not necessary to postpone the execution of the stereoscopic image generation step 330 until all the pieces of depth information 270 are generated for the original image 200. The pieces of depth information 270 for pixels 204 that have been set may be successively used in the stereoscopic image generation step 330 to generate the stereoscopic image 280 pixel by pixel. Of course, if necessary, it is preferable to form an image of or visualize the pieces of depth information 270 as the depth map 260, as shown in the present embodiment. This is convenient when the operator of the stereoscopic image generation system 1 visually checks the set status of the pieces of depth information 270.

After completion of the generation of the stereoscopic image 280 from the original image 200, the process proceeds to step 340 to determine whether or not the current original image 200 is the last frame in the moving image. If the current original image 200 is not the last frame, the process returns to step 302. Then the next original image (frame) 200 is extracted, and the above steps are repeated. If the original image 200 used to generate the stereoscopic image 280 is the last frame in the moving image, the stereoscopic image generation procedure is ended.

As described above, in the stereoscopic image generation system 1 in the present embodiment, the pieces of depth information 270 that serve as the basis of the stereoscopic effect in the generated stereoscopic image 280 are generated using the pieces of shortest-path information 268 computed from the cumulative sums of the pieces of weight information 264 along the shortest paths between a plurality of pixels 204. Therefore, the pieces of depth information 270 for groups of pixels 204 connected through edges 262 can have continuity. A natural sense of depth can thereby imparted to the stereoscopic image 280 generated using the pieces of depth information 270. In particular, the discontinuous phenomenon that occurs in a conventional stereoscopic image due to steep changes in pieces of depth information at the boundaries between a human on the front side and a background on the deeper side can be suppressed, so that a stereoscopic effect that allows the viewer to have a reduced uncomfortable feeling can be imparted to the stereoscopic image 280. In addition, the suppression of the discontinuous phenomenon allows suppression of the occurrence of gaps in the generated stereoscopic image 280. Therefore, the amount of image correction (blurring and image deformation) for correcting the gaps is reduced, and deterioration of the image quality is thereby reduced.

In the stereoscopic image generation system 1, the start area 266 is selected from the pixels in the region 200A for the deepest part in the original image 200 or from the pixels in the region 200B for the frontmost part. The start area 266 is used as the reference point (zero point) when the pieces of shortest-path information 268 for other pixels 204 are computed. The selection of the start area 266 from pixels 204 in the deepest or frontmost part allows the depth map 260 to be generated without an uncomfortable feeling. The selection of the start area 266 may be performed by displaying the original image 200 on the display unit (display) 22 to prompt the operator of the stereoscopic image generation system 1 to select as the start area 266 a pixel in a part that is assumed by the operator to be the deepest or frontmost part. Alternatively, the stereoscopic image generation system 1 may analyze the original image 200 to estimate the region 200A for the deepest part or the region 200B for the frontmost part so that the start area 266 is automatically selected from the pixels in the region 200A or 200B.

With this method, almost all the pieces of depth information 270 can be computed automatically, and the processing load on the operator of the stereoscopic image generation system 1 can thereby be reduced significantly. In a conventional system, a complicated operation must be performed. More specifically, an optimal template is selected from a plurality of templates for possible representative scenes (such as the scenes of a mountainous region, sea, room, or street) while the resultant stereoscopic image is checked, and then the depth map 260 is corrected.

In the example shown in the first embodiment, one pixel is selected as the start area 266 in the start area selection step 316, but the present invention is not limited thereto. For example, as exemplified in FIG. 3, a plurality of pixels 204 contained in the predetermined region 200C in the original image 200 may be selected as one start area 266. This means that, when the shortest path technique is used, the pieces of shortest-path information and the pieces of weight information for the edges between all the pixels 204 contained in this region are pre-set to zero or a fixed value (reference value). In this manner, even when this region contains video noise, the influence of the noise can be cut out. In addition, the computation for a region, such as a region for a fleckless blue sky, to which different senses of depth are not required to be given can be omitted, and therefore the time required for image processing for computing shortest paths can be significantly reduced. The above description is limited to the case in which a predetermined specified region is used as a start area 266. However, pixels other than the start area can be grouped, and the grouped pixel region can be used. For example, such pixel grouping to set a region is preferable for a simple subject in which common depth information can be used for a plurality of adjacent pixels in the region having a certain area. In this case, the operator instructs the system to treat the pixels in the grouped region as a virtual single pixel. In this manner, the time required for image processing for computing the shortest paths can be significantly reduced.

Example 1

The stereoscopic image generation system 1 of the present embodiment was used to compute pieces of depth information 270 in an original still image 200, and a depth map 260 was generated to visualize these pieces of depth information 270 experimentally. The results are shown in FIGS. 7A and 7B. The original image 200 in FIG. 7A shows a scene in which a woman is standing in a field with trees arranged on both sides under a blue sky. One pixel in the blue sky region that is positioned on the deepest side was selected as the start area 266. The depth map 260 in FIG. 7B is a gray-scale image in which the pieces of depth information 270 are visually displayed, i.e., the minimum value of the pieces of depth information 270 (the value for the start area 266 is the minimum value "0") is expressed by black color and the maximum value of the pieces of depth information 270 is expressed by white color. In the depth map 260 generated by the stereoscopic image generation system 1, the region around the far blue sky is expressed by black color, and the trees arranged on both sides are expressed by gray color on the deeper side and by white color on the front side. The woman at the center is expressed such that the outline part is expressed by gray color and the central part is expressed by color close to the white color. Therefore, a delicate sense of depth including the stereoscopic effect on the women was found to be obtained. In addition, the difference in gray scale at the boundary between the blue sky and the head of the woman that are originally spaced apart from each other by a large distance is not extremely large. Therefore, it was found that the discontinuous phenomenon in the stereoscopic image that can occur in a conventional stereoscopic image due to an extremely large change in the depth information can be suppressed. As can be seen by comparing the original image 200 with the depth map 260, the gray scale levels and the actual perspective are very correctly represented.

Figure 8:
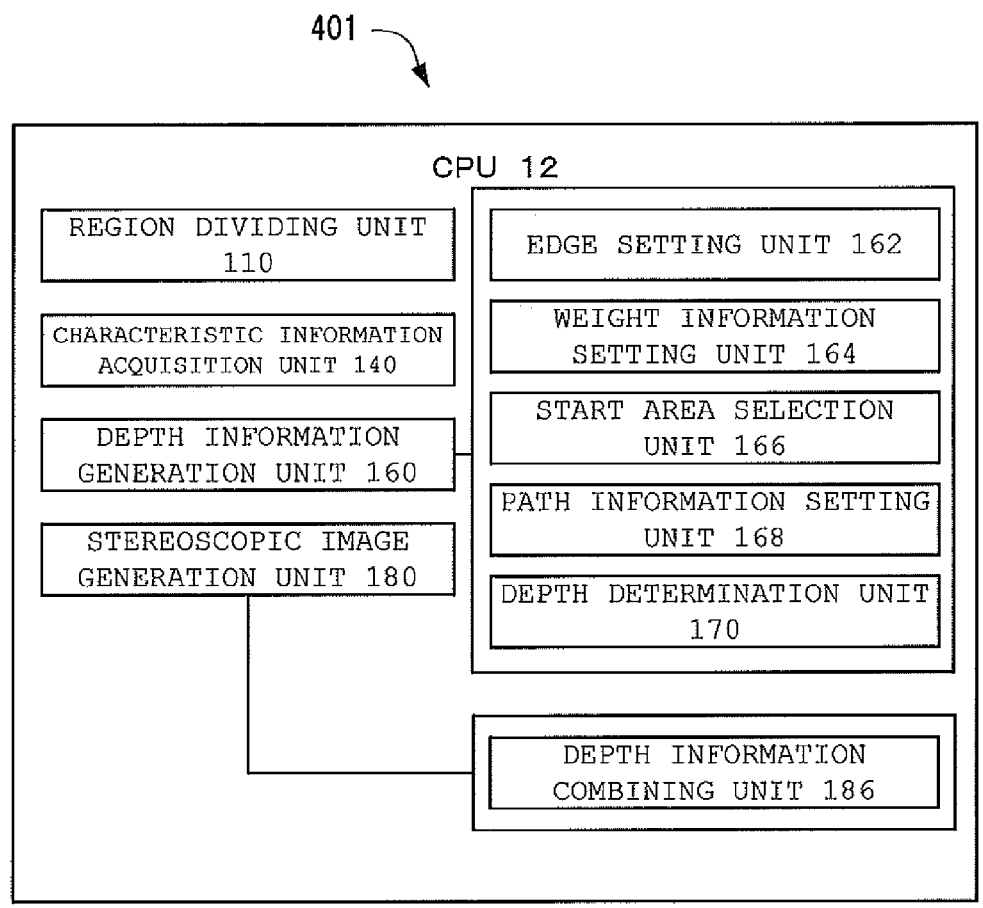
FIG. 8 is a block diagram illustrating the functional configuration of a stereoscopic image generation system according to a second embodiment of the present invention.

A stereoscopic image generation system 401 according to a second embodiment of the present invention will next be described with reference to FIG. 8. The same or similar parts as those in the stereoscopic image generation system in the first embodiment are denoted by the same names or reference numerals, and the description thereof is omitted. The differences will be mainly described.

The stereoscopic image generation system 401 is configured to include a region dividing unit 110 implemented by a region dividing program in addition to the characteristic information acquisition unit 140, the depth information generation unit 160, and the stereoscopic image generation unit 180.

Figure 9:
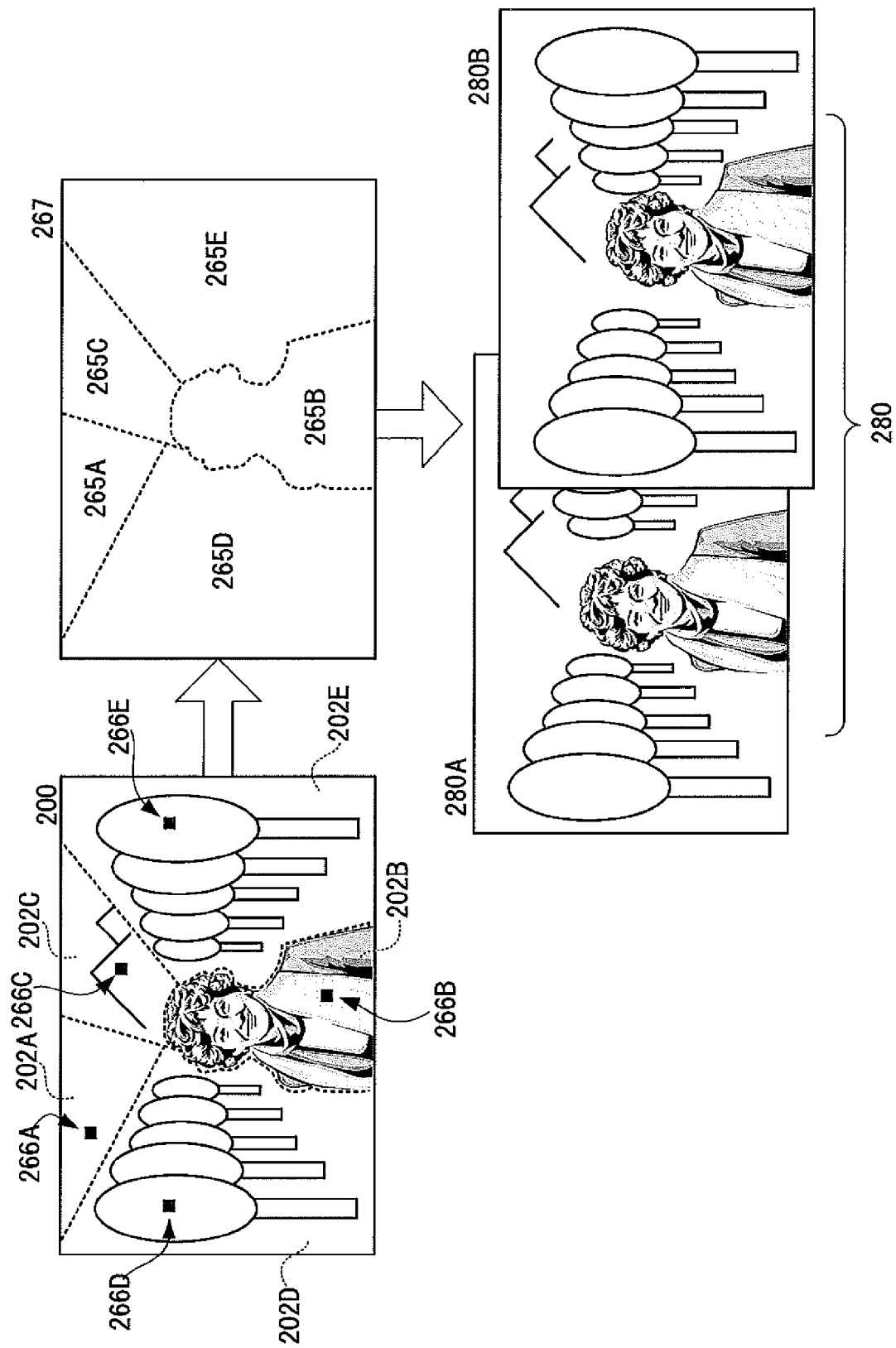
FIG. 9 is a block diagram illustrating the flow of generating a stereoscopic image in the stereoscopic image generation system.

The region dividing unit 110 divides an original image 200 into a plurality of regions 202, as shown in FIG. 9. The depth information generation unit 160 generates pieces of depth information 270 of pixels 204 for each of the plurality of regions 202A to 202E on the basis of the pieces of characteristic information 240 and then generates individual depth maps 265 corresponding to the regions 202A to 202E. The stereoscopic image generation unit 180 generates a stereoscopic image 280 (including a right-eye image 280A and a left-eye image 280B), in which the positions of the pixels 204 have been changed, on the basis of the plurality of individual depth maps 265A to 265E generated for the plurality of regions 202A to 202E.

In particular, in the present embodiment, the stereoscopic image generation unit 180 includes a depth information combining unit 186. The depth information combining unit 186 combines the plurality of individual depth maps 265A to 265E generated for the regions 202A to 202E by the depth information generation unit 160 to generate a single combined depth map 267. Therefore, the operator can visually check the overall stereoscopic effect using the combined depth map 267. The stereoscopic image generation unit 180 generates the right-eye image 280A and the left-eye image 280B using the combined depth map 267. When the operator need not use the combined depth map 267, the depth information combining unit 186 may not be used, as described above. Specifically, in the stereoscopic image generation unit 180, the pieces of depth information 270 of the pixels 240 that have been set for each of the regions 202A to 202E by the depth information generation unit 160 may be used to generate the stereoscopic image 280.

More specifically, when the region dividing unit 110 divides the original image 200 into the plurality of regions 202A to 202E, the start area selection unit 166 selects start areas 266A to 266E for the plurality of regions 202A to 202E. Therefore, the path information setting unit 168 computes shortest paths for each of the plurality of regions 202A to 202E and sets a piece of shortest-path information 268 for each of the pixels 204 in the regions 202A to 202E. In particular, in the second embodiment, the region dividing unit 110 divides the original image 200 into the plurality of regions 202A to 202E such that subjects contained in the original image 200 are used as main units.

Therefore, the pieces of depth information 270 can be independently computed for each of the regions 202A to 202E set in the original image 200. For example, when an original image 200 contains part of a building and part of a human that are completely independent from each other from a stereoscopic point of view and therefore clear stereoscopic continuity should not be given to the boundaries between the building, human, and other regions, the division is performed so that the building and other subjects are assigned to any of the regions 202A to 202E, and pieces of depth information 270 are set individually for each region. Therefore, the pieces of depth information 270 are computed for each of the regions 202A to 202E using the technique for computing shortest paths from corresponding one of the start areas 266A to 266E, and pieces of continuous and fine depth information 270 are obtained in each of the regions 202A to 202E.

When the start areas 266A to 266E are set for the regions 202A to 202E, respectively, the pieces of shortest-path information 268 of the start areas 266A to 266E are "zero." Therefore, if these values are used as they are as the depth information 270, the relative sense of depth may differ between the plurality of individual depth maps 265. Preferably, the depth determination unit 170 determines the pieces of depth information 270 after the piece of shortest-path information 268 are collectively corrected for each of the individual depth maps 265A to 265E. For example, a constant correction value for front-side shifting is added to the pieces of shortest-path information 268 of all the pixels 204 in the second individual depth map 265B for the second region 202B on the front side while the pieces of shortest-path information 268 in the first individual depth map 265A for the first region 202A on the background side are used without any correction, and the resultant values are used as the pieces of depth information 270. In this manner, the sense of depth is corrected for each of the individual depth maps 265A to 265E, a delicate and smooth stereoscopic effect can be imparted to each of the regions 202A to 202E, and a clear difference in stereoscopic effect can be obtained between the plurality of individual depth maps 265A to 265E.

In the example shown in the present embodiment, the original image 200 is divided into a plurality of regions 202A to 202E, and the start areas 266A to 266E are selected inside the regions 202A to 202E. However, the present invention is not limited thereto.

Figure 10:
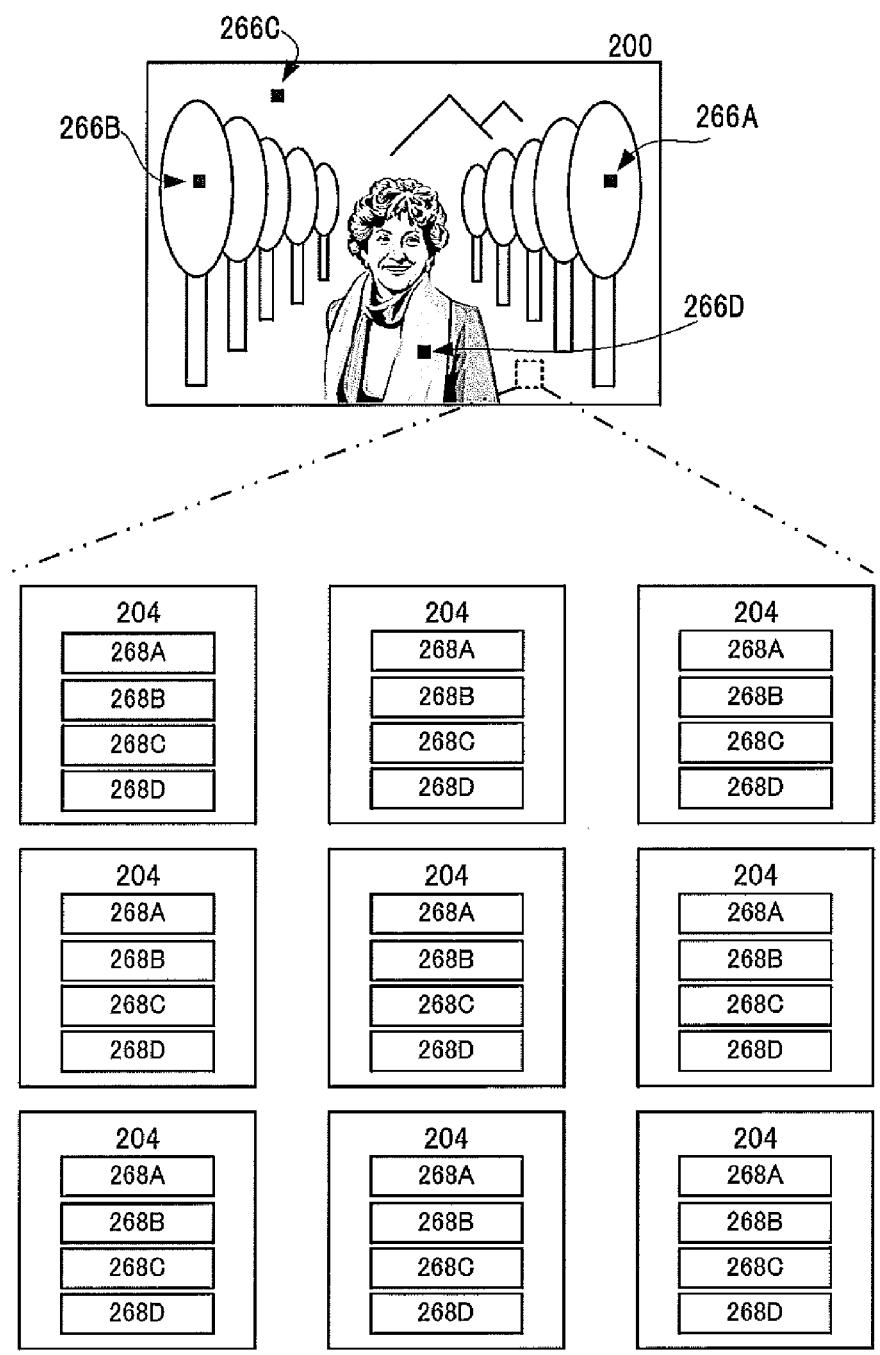
FIG. 10 is a block diagram illustrating another example of the flow of generating a stereoscopic image in the stereoscopic image generation system.

For example, as shown in FIG. 10, the start area selection unit 166 may select a plurality of start areas 266A to 266D from the entire pixels in the original image 200 irrespective of whether or not the original image 200 is divided into regions, and the path information setting unit 168 may compute the shortest paths from the start areas 266A to 266D to all the pixels 204 in the original image 200 and set a plurality of pieces of shortest-path information 268A to 268D for each of the pixels.

The depth determination unit 170 selects one from the plurality of pieces of shortest-path information 268A to 268D set for each of the pixels 204 to determine the depth information 270. The depth determination unit 170 may determine the depth information 270 using the plurality of pieces of shortest-path information 268A to 268D set for each of the pixels 204. The determination as to whether one piece of shortest-path information is selected from the plurality of pieces of shortest-path information 268A to 268D or the plurality of pieces of shortest-path information 268A to 268D are used may be performed over the entire original image 200 or for each of the pixels 204. When the pixels 204 are grouped into a plurality of regions, it is also preferable to make the determination for each of the regions.

Figure 11:
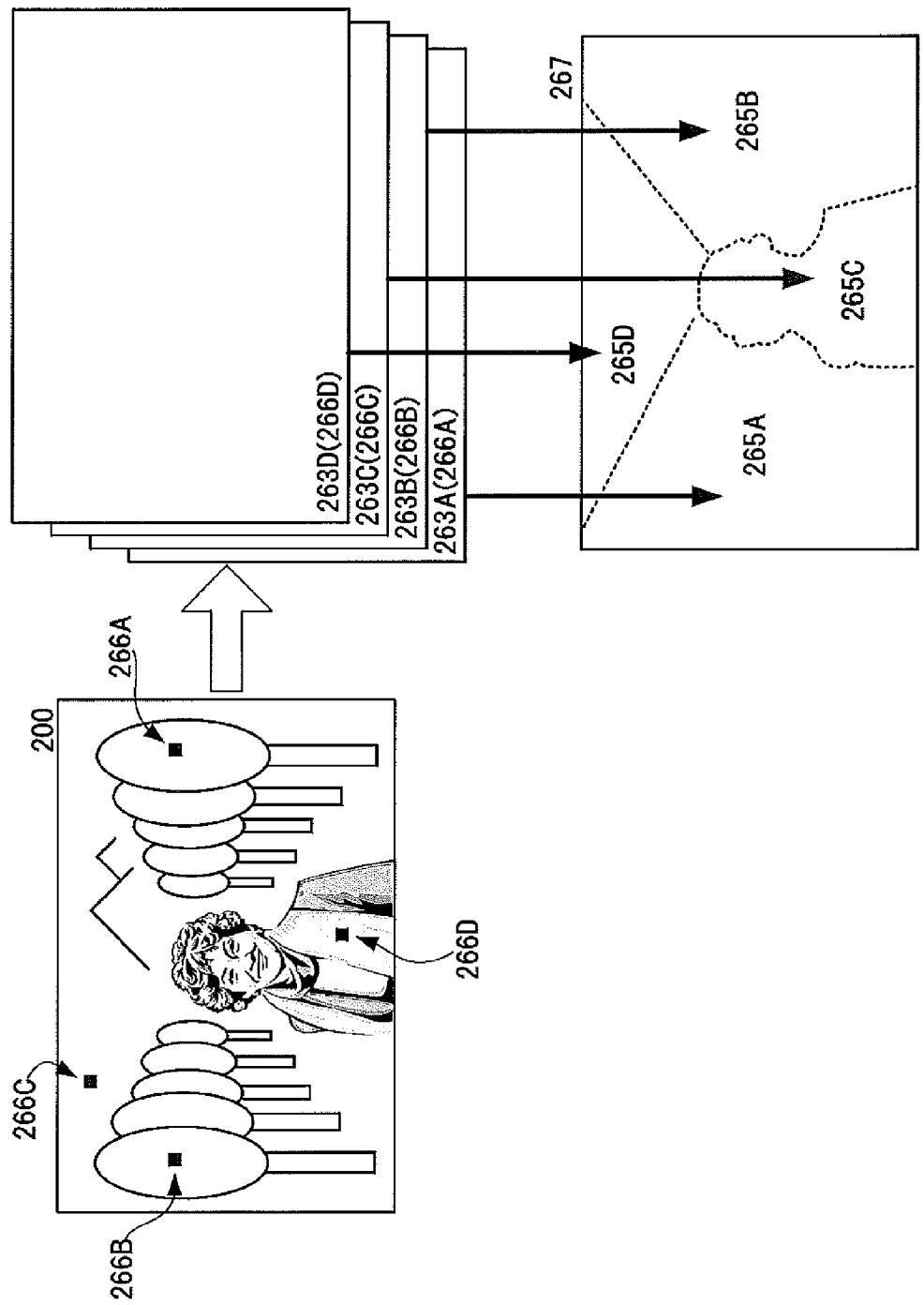
FIG. 11 is a block diagram illustrating the another example of the flow of generating the stereoscopic image in the stereoscopic image generation system.

Referring to FIG. 11, this method will be described from a different point of view. The depth information generation unit 160 generates a plurality of temporary depth maps 263A to 263D for the start areas 266A to 266D. Then the depth determination unit 170 determines whether one of the plurality of temporary depth maps 263A to 263D generated for the start areas 266A to 266D is used or two or more of them are used in a superposed manner. When the original image 200 has been divided into a plurality of regions 202A to 202D, individual depth maps 265A to 265D corresponding to the regions 202A to 202D are generated when the determination is made for each of the regions 202A to 202D. The individual depth maps 265A to 265D can be combined to obtain a combined depth map 267.

In this manner, the choices when the pieces of depth information 270 are determined can be increased. In the present embodiment, the choices mean the start areas 266A to 266D. Particularly in this case, the start areas 266A to 266D are selected from the pixels in a large area including the regions outside the regions 202A to 202D. For example, in the first region 202A located on the left side in the original image 200, the pieces of shortest-path information 268A (the temporary depth map 263A) computed on the basis of the start area 266A on the right side of the original image 200 can be used. In the second region 202B located on the right side in the original image 200, the pieces of shortest-path information 268B (the temporary depth map 263B) computed on the basis of the start area 266B on the left side of the original image 200 can be used. For example, in the third region 202C located on the front side in the original image 200, the pieces of shortest-path information 268C (the temporary depth map 263C) computed on the basis of the start area 266C on the deep side of the original image 200 can be used. In the fourth region 202D located on the deep side in the original image 200, the pieces of shortest-path information 268D (the temporary depth map 263D) computed on the basis of the start area 266D on the front side of the original image 200 can be used.

As described above, it is also preferable that, for example, a plurality of pieces of shortest-path information be selected from the pieces of shortest-path information 268A to 268D (the temporary depth maps 263A to 263D) and the pieces of depth information 270 (the combined depth map 267) be determined using the selected pieces of shortest-path information. In this manner, even when some of the pieces of shortest-path information 268A to 268D (the temporary depth maps 263A to 263D) contain errors that cause incorrect pieces of depth information, if the rest of the pieces of shortest-path information 268A to 268D (the temporary depth maps 263A to 263D) can give correct pieces of depth information, the combined use of these pieces of information can correct the errors automatically, and more smooth depth information 270 (a combined depth map 267) can be obtained. When the plurality of pieces of shortest-path information 268A to 268D are used to determine the depth information 270, any of various computation methods such as the sum or average of these values can be used.

Figure 12:
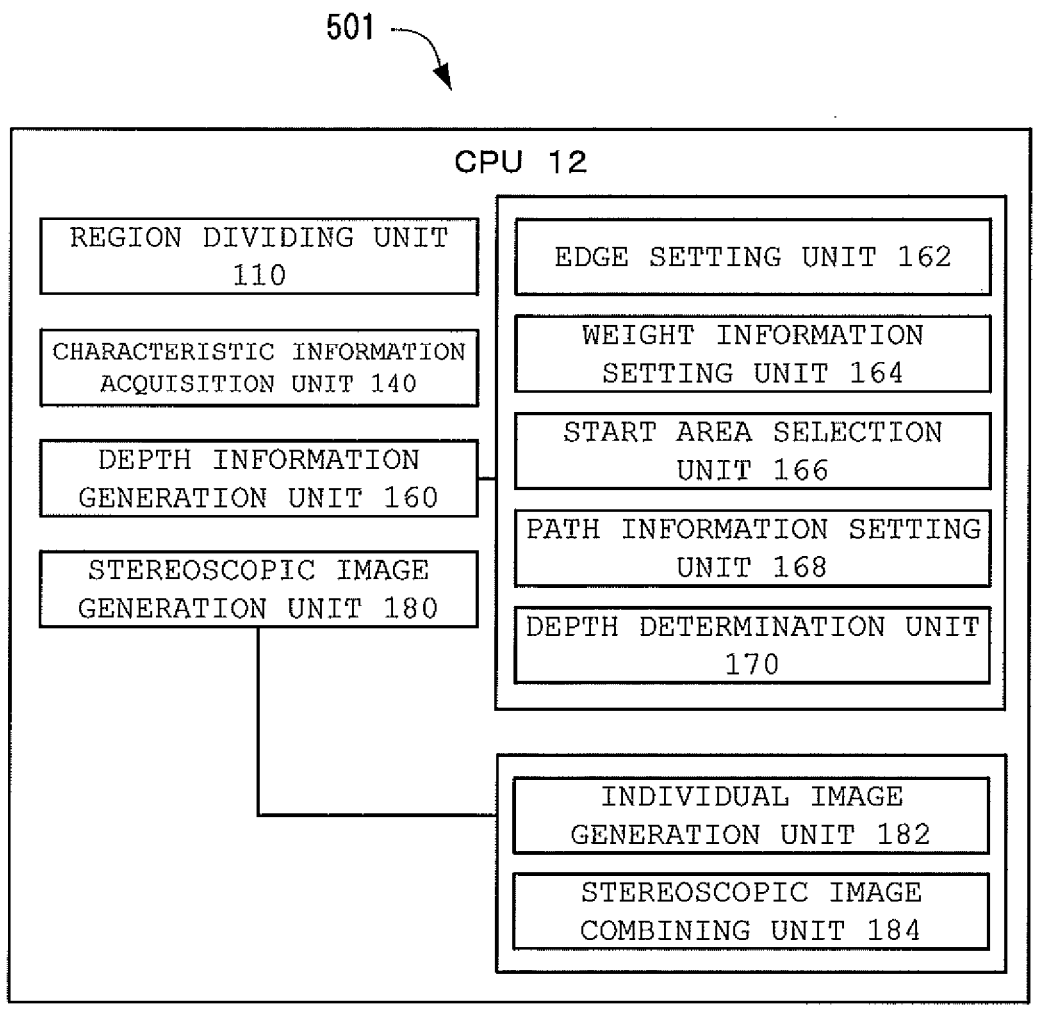
FIG. 12 is a block diagram illustrating the functional configuration in the another example of the stereoscopic image generation system.

In the example shown in the second embodiment, after the individual depth maps 265 are combined to generate the combined depth map 267, a stereoscopic image 280 (including a right-eye image 280A and a left-eye image 280B) is generated, but the present invention is not limited thereto. For example, in a stereoscopic image generation system 501 shown in FIGS. 12 and 13, the stereoscopic image generation unit 180 includes an individual image generation unit 182 and a stereoscopic image combining unit 184. The individual image generation unit 182 generates individual stereoscopic images 282A to 282D (including individual right-eye images and individual left-eye images) for the regions 202A to 202D in which the positions of pixels have been changed on the basis of the individual depth maps 265A to 265D. The individual stereoscopic images 282A to 282D are generated for all original images 200 (all frames in a moving image) while the operator checks the quality of the finished individual stereoscopic images 282A to 282D for the regions 202A to 202D. Then the stereoscopic image combining unit 184 combines these individual stereoscopic images 282A to 282D to generate stereoscopic images 280 (including right-eye images 280A and left-eye image 280B).

In the stereoscopic image generation system 501, the time required to generate individual stereoscopic images 282A to 282D can be significantly shorter than the time required to generate an overall stereoscopic image 280. Therefore, the operator can work while efficiently checking the stereoscopic effect in each of the regions 202A to 202D. More specifically, after the stereoscopic effect is finely adjusted and checked for each of the regions 202A to 202D to improve the quality of the individual stereoscopic images 282A to 282D, the individual stereoscopic images 282A to 282D are combined to generate a final stereoscopic image 280 (including a right-eye image 280A and a left-eye image 280B). Therefore, the stereoscopic image 280 obtained has a reduced uncomfortable feeling.

In the second embodiment, a plurality of start areas 266 used for reference values for the computation of a sense of depth are selected. The use of a combination of any of these start areas allows the pieces of depth information 270 to be determined according to the scene of the original image 200 in a more flexible manner. Particularly, since the original image 200 is divided into a plurality of regions 202A to 202D and the start areas 266A to 266D are selected optimally for the regions 202A to 202D, a more natural stereoscopic effect can be obtained.

In the examples shown in the above embodiments, a shortest path that gives the minimum value of the sum of the pieces of weight information 264 along the path from the start area 266 to each pixel 204 is computed in the path information setting step 318, but the present invention is not limited thereto. For example, the Prim's algorithm may be used to determine, from paths composed of partial groups of sides for all the pixels 204, a path in which the sum of the weights in the groups of sides is smallest. More specifically, in the present invention, any algorithm can be used so long as certain weight values can be specified using various paths between the pixels.

The examples shown in the above embodiments are limited to the case in which a binocular parallax stereoscopic image including a right-eye image and a left-eye image is generated, but the present invention is not limited thereto. For example, a multi-view stereoscopic image may be generated using the depth information, and a multi-view parallax stereoscopic image can also be generated. More specifically, in the present invention, any type of stereoscopic images that use depth information can be generated.

The stereoscopic image generation method and stereoscopic image generation system of the present invention are applicable to, in addition to the field of production of movie, TV program, etc., the field of various devices, such as television sets and game machines, on which stereoscopic images converted from normal images are displayed.

The entire disclosure of Japanese Patent Application No. 2011-94710 filed on Apr. 21, 2011 including specification, claims, drawings, and summary are incorporated herein by reference in its entirety.

What is claimed is:
1. A stereoscopic image generation method comprising:
    a characteristic information acquisition step of acquiring characteristic information for each of pixels constituting an original image;
    a region dividing step of dividing the original image into a plurality of regions,
    a depth information generation step of generating depth information for each of the pixels on the basis of the characteristic information; and
    a stereoscopic image generation step of generating a stereoscopic image in which positions of the respective pixels are changed on the basis of the pieces of depth information, wherein
    the depth information generation step includes
        an edge setting step of setting an edge for each of pairs of pixels extracted from the original image,
        a weight information setting step of setting weight information for each of the edges on the basis of the characteristic information,
        a start area selection step of selecting a start area from the pixels, a path information setting step of computing a path connecting a pair of pixels by the edge from the start area to each of the pixels, acquiring a sum of pieces of weight information on each of the paths and setting a path information for each of the pixels on the basis of the sum of pieces of weight information on the path, a depth determination step of setting the depth information for each of the pixels on the basis of the path information for the pixel, wherein in the edge setting step, the edge is set for a pair of adjacent pixels and/or a pair of separated or isolated pixels, in the start area selection step, the start area is selected as a common start point of the paths, in the start area selection step the start area is selected independently for each of the plurality of regions, and in the path information setting step, the path is computed independently for each of the plurality of regions, and the path information is set for each of the pixels.

2. The stereoscopic image generation method according to claim 1, wherein in the start area selection step, a pixel contained in a region for a deepest part in the original image or a pixel contained in a region for a frontmost part in the original image is selected as the start area.

3. The stereoscopic image generation method according to claim 1, wherein in the start area selection step, a plurality of start areas are selected, in the path information setting step, the path is computed for each of the plurality of start areas, and a plurality of pieces of path information are set for each of the pixels, and in the depth determination step, the depth information for each pixel is set on the basis of the plurality of pieces of path information set for the each pixel by selecting one from the plurality of pieces of path information set for each of the pixels or combining the plurality of pieces of path information.

4. The stereoscopic image generation method according to claim 1, wherein in the start area selection step, a plurality of pixels contained in a predetermined region in the original image are combined and selected as a single start area.

5. The stereoscopic image generation method according to claim 3, wherein in the start area selection step, a plurality of pixels contained in a predetermined region in the original image are combined and selected as a single start area.

6. The stereoscopic image generation method according to claim 3, further comprising a region dividing step of dividing the original image into a plurality of regions, and wherein in the start area selection step, the start area is selected independently for each of the plurality of regions, and in the path information setting step, the path is computed independently for each of the plurality of regions, and the path information is set for each of the pixels.

7. The stereoscopic image generation method according to claim 4, further comprising a region dividing step of dividing the original image into a plurality of regions, and wherein in the start area selection step, the start area is selected independently for each of the plurality of regions, and in the path information setting step, the path is computed independently for each of the plurality of regions, and the path information is set for each of the pixels.

8. The stereoscopic image generation method according to claim 1, wherein in the region dividing step, the original image is divided into a plurality of regions corresponding to subjects contained in the original image.

9. A stereoscopic image generation system constituted by a computer, the system comprising:

characteristic information acquisition means for acquiring characteristic information for each of pixels constituting an original image;

region dividing means for dividing the original image into a plurality of regions, depth information generation means for generating depth information for each of the pixels on the basis of the characteristic information; and stereoscopic image generation means for generating a stereoscopic image in which positions of the respective pixels are changed on the basis of the pieces of depth information, wherein the depth information generation means includes edge setting means for setting an edge for each of pairs of pixels extracted from the original image, weight information setting means for setting weight information for each of the edges on the basis of the characteristic information, start area selection means for selecting a start area from the pixels, path information setting means for computing a path connecting a pair of pixels by the edge from the start area to each of the pixels, acquiring a sum of pieces of weight information on each of the paths and setting a path information for each of the pixels on the basis of the sum of pieces of weight information on the path, depth determination means for setting the depth information for each of the pixels on the basis of the path information for the pixel, wherein the edge setting means sets the edge for a pair of adjacent pixels and/or a pair of separated or isolated pixels, the start area selection means selects the start area as a common start point of the paths the start area selection means selects the start area independently for each of the plurality of regions, and the path information setting means computes the path independently for each of the plurality of regions, and the path information is set for each of the pixels.

10. The stereoscopic image generation method according to claim 1, wherein in the path information setting step, a shortest path which is considered to have a smallest sum of pieces of weight information is computed for each of the pixels and the path information is set on the basis of the sum of pieces of weight information on the shortest path.

11. The stereoscopic image generation method according to claim 1, wherein in the path information setting step, the path is computed on the basis of solving a shortest path problem or a minimum spanning tree problem.

12. The stereoscopic image generation system according to claim 9, wherein the path information setting means computes a shortest path which is considered to have a smallest sum of pieces of weight information for each of the pixels and sets the path information on the basis of the sum of pieces of weigh information on the shortest path.

13. The stereoscopic image generation system according to claim 9, wherein the path information setting means computes the path on the basis of solving a shortest path problem or a minimum spanning tree problem.

14. The stereoscopic image generation method according to claim 1, wherein the depth information generation step further includes:

a pixel grouping step of setting the path information for every pixel contained in an operator selected region in the original image is set to zero or a fixed value and setting the weight information for every edge which connects a pair of pixels contained in the operator selected region is set to zero or a fixed value.

15. The stereoscopic image generation system according to claim 9, wherein the depth information generation means further includes:

a pixel grouping means for setting the path information for every pixel contained in an operator selected region in the original image is set to zero or a fixed value and setting the weight information for every edge which connects a pair of pixels contained in the operator selected region is set to zero or a fixed value.

* * * * *